US010065571B1

(12) United States Patent
Ajami et al.

(10) Patent No.: US 10,065,571 B1
(45) Date of Patent: Sep. 4, 2018

(54) STRUCTURAL SUBWOOFER

(71) Applicant: Ford Global Technologies, LLC, Dearborn, MI (US)

(72) Inventors: Hussein Ajami, Dearborn, MI (US); Paul Edward Guzman, Clawson, MI (US); Michael James Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/485,350

(22) Filed: Apr. 12, 2017

(51) Int. Cl.
| | |
|---|---|
| *H04B 1/00* | (2006.01) |
| *B60R 11/02* | (2006.01) |
| *B62D 25/04* | (2006.01) |
| *H04R 1/02* | (2006.01) |
| *H04R 1/24* | (2006.01) |
| *B60R 11/00* | (2006.01) |

(52) U.S. Cl.
CPC .......... *B60R 11/0217* (2013.01); *B62D 25/04* (2013.01); *H04R 1/025* (2013.01); *H04R 1/24* (2013.01); *B60R 2011/0043* (2013.01); *H04R 2201/028* (2013.01); *H04R 2499/13* (2013.01)

(58) Field of Classification Search
CPC .... H04R 1/025; H04R 1/24; H04R 2201/028; H04R 2499/13; B62D 25/04; B60R 11/0217; B60R 2011/0043
See application file for complete search history.

(56) References Cited

U.S. PATENT DOCUMENTS

| | | | |
|---|---|---|---|
| 9,351,059 B1 * | 5/2016 | Suhre | H04R 1/025 |
| 2007/0080563 A1 * | 4/2007 | Eipper | B62D 25/04 |
| | | | 296/193.06 |
| 2015/0266515 A1 | 9/2015 | Hulbert | |
| 2016/0368430 A1 * | 12/2016 | Orellana | B60R 11/0217 |
| 2017/0013336 A1 * | 1/2017 | Stys | H04R 1/2811 |
| 2017/0210306 A1 * | 7/2017 | Tavakoli Targhi | |
| | | | B60R 13/0268 |
| 2017/0259856 A1 * | 9/2017 | An | B62D 29/043 |

FOREIGN PATENT DOCUMENTS

| | | | | |
|---|---|---|---|---|
| EP | 2211562 A1 * | 7/2010 | ........ | B60R 11/0217 |
| WO | 2016097537 A1 | 6/2016 | | |

* cited by examiner

*Primary Examiner* — Andrew L Sniezek
(74) *Attorney, Agent, or Firm* — Jason C. Rogers; Brooks Kushman P.C.

(57) ABSTRACT

A vehicle includes a body structure having a first structural component and a second structural component spaced apart to define a space. A structural subwoofer is disposed in the space and includes a case formed of a material having a high modulus of elasticity. The case has a first attachment connected to the first component and a second attachment connected to the second component to form a structural bridge spanning between the components and defining a load path from the first component, through the case, and into the second component.

18 Claims, 4 Drawing Sheets

STRUCTURAL SUBWOOFER

TECHNICAL FIELD

This disclosure relates to a structural subwoofer that forms a load-bearing member of a vehicle body structure.

BACKGROUND

Vehicles include a body structure formed from a plurality of individual components that are interconnected to create a frame structure for the vehicle. Many automobiles include audio systems having a subwoofer. Subwoofers include a speaker and other electronics disposed within a housing. The housing is typically formed of low-strength plastic designed to only support the weight of the speaker.

Subwoofers are a relatively large and require designers to specifically engineer the vehicle body structure so that a large packaging space for receiving the subwoofer is provided between the components of the body structure. In many instances, an optimized body structure would have a load-bearing member extending through the subwoofer packaging space. But, in order to package the subwoofer, this load-bearing member is omitted and the body structure is redesigned, in a less efficient way, so that the load paths of the body structure extend around the subwoofer packaging space. This disclosure addresses these and other problems.

SUMMARY

According to one embodiment, a vehicle includes a body structure having a first structural component and a second structural component spaced apart to define a space. A structural subwoofer is disposed in the space and includes a case formed of a material having a high modulus of elasticity. The case has a first attachment connected to the first component and a second attachment connected to the second component to form a structural bridge spanning between the components and defining a load path from the first component, through the case, and into the second component.

According to another embodiment, a vehicle body structure includes a wheel-house assembly and a D-pillar. A subwoofer is disposed between the D-pillar and the wheel-house assembly. The subwoofer includes a carbon-fiber case having a first attachment attached to the assembly and a second attachment attached to the D-pillar to form a structural bridge spanning between the D-pillar and the assembly and defining a load path from the assembly, through the case, and into the D-pillar.

According to yet another embodiment, a vehicle body structure includes a first structural component and a second structural component. A subwoofer is disposed between the components and includes a case having first and second attachments connected to the first and second components, respectively. The case further has a reinforcing plate with a first portion attached to the first attachment and a second portion attached to the second attachment to define a load path from the first component, through the plate, and into the second component.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
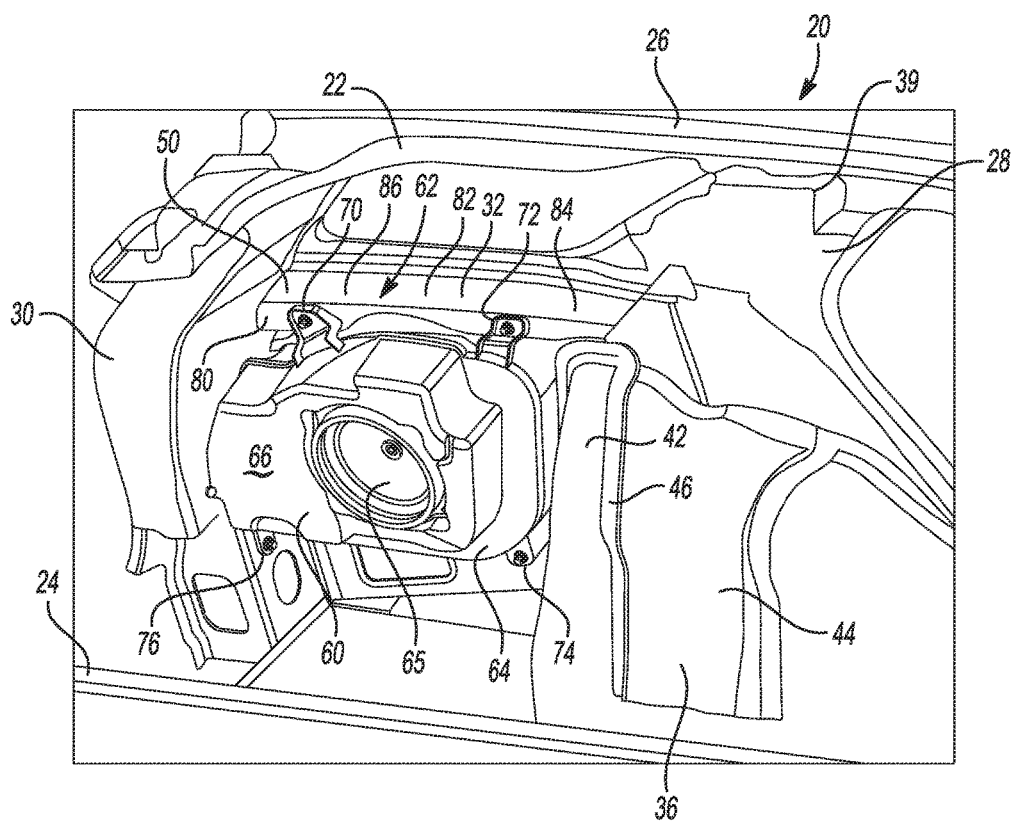
FIG. 1 is a perspective view of rear portion of a body structure of a vehicle looking from inside the vehicle and a front side of a structural subwoofer attached to the body structure.
Figure 2:
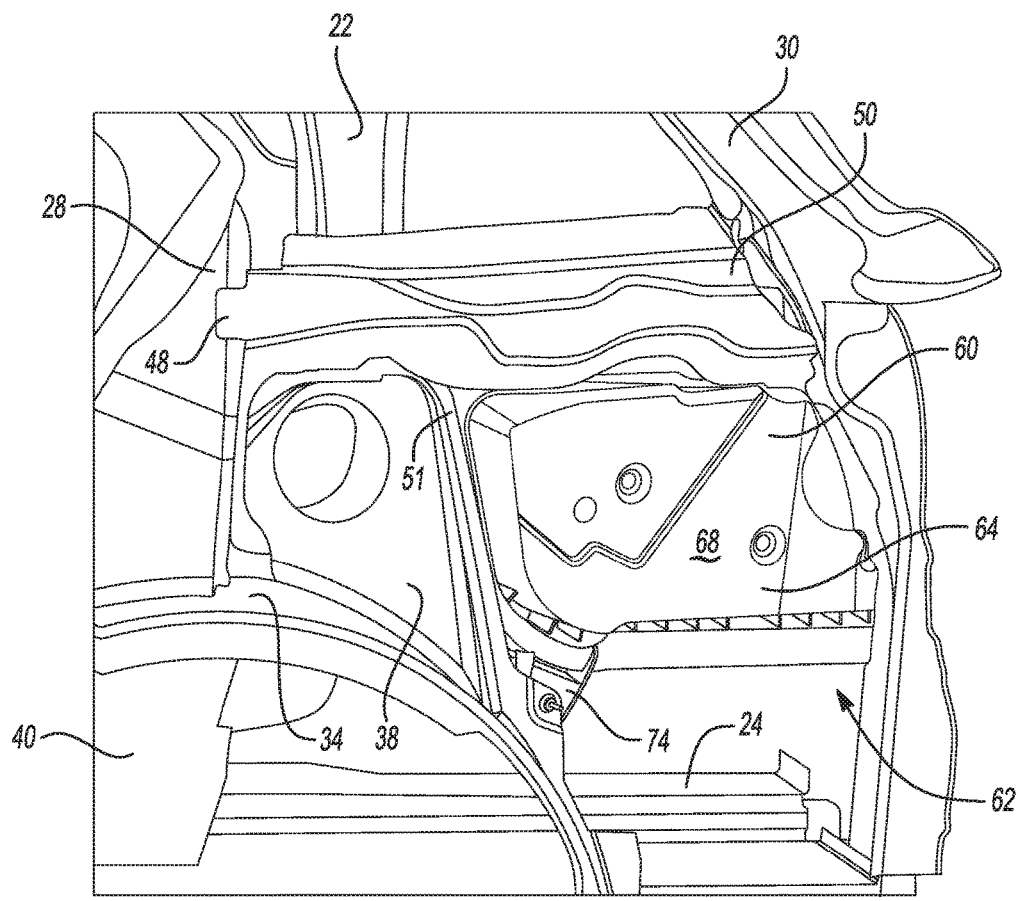
FIG. 2 is a perspective view of the vehicle body structure looking from outside the vehicle and at backside of the structural subwoofer.

Referring to FIGS. 1 and 2, a vehicle 20, such as a sport-utility vehicle, includes a vehicle body structure 22. The vehicle body structure 22 may have unibody construction where the frame rails 24 are integrated with the body structure 22. The vehicle body structure 22 has a plurality of structural components such as a roof rail 26 and a plurality of pillars extending downwardly from the roof rail 26 towards the frame 24. For example, the vehicle body structure 22 may include a C-pillar 28 near the back of the passenger compartment and a D-pillar 30 near the rear of the vehicle 20. The C-pillar and the D-pillar are spaced apart from each other in a longitudinal direction of the vehicle. A beltline reinforcement 32 is connected between the C-pillar 28 and the D-pillar 30. A rear wheel-house assembly 34 disposed between the D-pillar 30 and the C-pillar 28.

The various components of the body structure 22, such as the roof rail 26, the pillars 28 and 30, the wheel-house assembly 34, and the beltline reinforcement 32, are typically formed of a plurality of metal stampings that are assembled together and are secured together by welding, fasteners, or other means known in the art. In some embodiments, one or more of the body-structure components are an exotic material such as carbon fiber or fiberglass. Other types of body-structure designs are also known, such as space frames, but this disclosure is not limited to any particular body-structure design.

The C-pillar 28 may include an upper component 39 attached to the roof rail 26, and a lower central component 40 attached to the frame rail 24. The wheel-house assembly 34 may include a wheel-house inner 36 and a wheel-house outer 38 that are each joined to the C-pillar 28. The wheel-house inner 36 may include a rear panel 42 and a central panel 44 that are joined together along a flange 46. The rear panel 42 may be joined to the wheel-house outer 38 along a flange 51. The beltline reinforcement 32 includes a front end 48 connected to the C-pillar 28 and extends rearwardly to a rear end 50 connected to the D-pillar 30. The beltline reinforcement 32 is also joined to the wheel-house inner 36 and the wheel-house outer 38.

As stated above, subwoofers require a large packaging area that interferes with the body-structure design. In order to improve the stiffness of body structure 22, the vehicle 20 includes a structural subwoofer assembly 60 located in a subwoofer packaging space 62 defined between the wheel-house assembly 34 and the D-pillar 30. The subwoofer assembly 60 forms a load-bearing component of the body structure 22 much like the pillars 28, 30 and the other components of the body structure 22. By providing the structural subwoofer assembly 60, a load-bearing member extends through the packaging space 62 to create a structural bridge between components of the body structure 22. As opposed to prior designs, where the packaging space is a devoid of structure. The structural subwoofer assembly 60 may allow for a reduction in body-structure components and/or gauge of the components without sacrificing strength and stiffness, which may reduce the weight of the vehicle 20 leading to increased fuel economy and vehicle performance.

The subwoofer assembly 60 includes an external case 64 that houses many of the components of the assembly 60. For example, a speaker 65 and associated electronic components are disposed in the case 64. A frame (not shown) may be disposed in the case 64 and support the speaker 65 within the case 64. The case 64 may define an opening adjacent the speaker 65 to reduce muffling of the sound waves produced by the speaker.

The case 64 is the main structural component of the subwoofer assembly 60. The structural case 64 may be formed of a material having a high modulus of elasticity (also known as Young's modulus). As used herein, "high" refers to a modulus of elasticity that is greater than or equal to 69 gigapascals (GPa). In some embodiments, it may be particularly advantageous to use a material having a modulus of elasticity that is greater than or equal to 150 GPa. Materials having a high modulus of elasticity include steel, carbon fiber, titanium alloy, aluminum alloy, and many others. Carbon fiber has a higher strength to weight ratio than most metals and may be a particularly well-suited material for a structural subwoofer case.

The case 64 may include a front piece 66 and a back piece 68 that are connected to each other. The case 64 may be attached to various components of the body structure 22 by fasteners, welding, or other techniques known in the art. In the illustrated embodiment, the case 64 is formed of carbon fiber and includes a first tab 70, a second tab 72, a third tab 74, and a fourth tab 76. The first, second, and forth tab 70, 72, 76 may be part of the front piece 66, and the third attachment 74 may be part of the back piece 68. The first attachment 70 and the second tab 72 may be attached to an inboard side 80 of the beltline reinforcement 32. The beltline reinforcement 32 has a midpoint 82 that defines a front half 84 and a rear half 86. The first tab 70 is attached to the rear half 86 and the second tab 72 is attached to the front half 84. The tabs may each define a hole for receiving a fastener, such as a bolt, that secures the case 64 to the beltline reinforcement 32. The fourth tab 76 may be attached to the D-pillar 30, and the third tab 74 may be attached to the wheel-house inner 36 and the wheel-house outer 38. These tabs may also define a hole for receiving a fastener.

In the illustrated embodiment, the case 64 is connected to the wheel-house assembly 34, D-pillar 30, and reinforcement 32, but, in other embodiments, the case 64 may be attached to other components depending upon the design of the body structure and the placement of the subwoofer. The case 64 is a load-bearing component and forms load paths through the packaging space 62 between the components surrounding the space 62. For example, a first load path transfers loads between the wheel-house assembly 34 and the D-pillar 30. The first load path extends from the wheel-house assembly 34, into the third tab 74, through the case 64 from the third tab 74 to the fourth tab 76, and into the D-pillar 30. The first load path is also capable of transferring loads from the D-pillar 30 to the wheel-house assembly 34.

A second load path transfers loads between the wheel-house assembly 34 and the beltline reinforcement 32. The second load path extends from the wheel-house assembly 34, into the third tab 74, through the case 64 from the third tab 74 to the first tab 70, and into the rear half 86 beltline reinforcement 32. The second load path is also capable of transferring loads from the beltline reinforcement 32 to the wheel-house assembly 34.

A third load path transfers loads between the D-pillar 30 and the beltline reinforcement 32. The third load path extends from the D-pillar 30, into the fourth tab 76, through the case 64 from the fourth tab 76 to the second tab 72, and into the front half 84 of the beltline reinforcement 32. The third load path is also capable of transferring loads from the beltline reinforcement 32 to the D-pillar 30.

A fourth load path transfers loads between the D-pillar 30 and the beltline reinforcement 32. The fourth load path extends from the D-pillar 30, into the fourth tab 76, through the case 64 from the fourth tab 76 to the first tab 70, and into the rear half 86 of the beltline reinforcement 32. The fourth load path is also capable of transferring loads from the beltline reinforcement 32 to the D-pillar 30.

A fifth load path transfers loads between the wheel-house assembly 34 and the beltline reinforcement 32. The fifth load path extends from the wheel-house assembly 34, into the third tab 74, through the case 64 from the third tab 74 to the second tab 72, and into the front half 84 of the beltline reinforcement 32. The fifth load path is also capable of transferring loads from the beltline reinforcement 32 to the wheel-house assembly 34.

Figure 3:
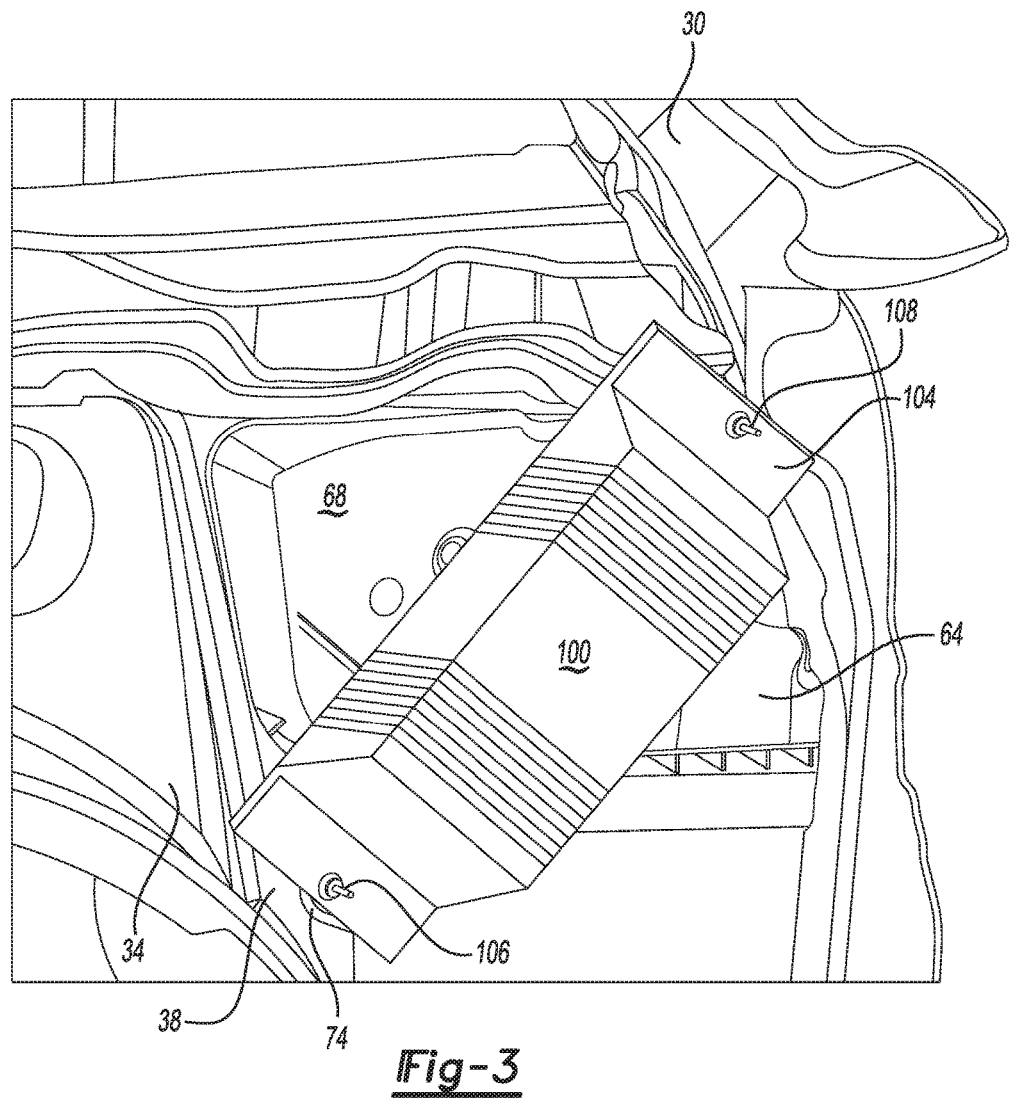
FIG. 3 is a perspective view of an amplifier attached to the backside of the subwoofer.

Referring to FIG. 3, an amplifier 100 may be attached to the back piece 68 of the subwoofer case 64. Amplifiers are relatively heavy components and are typically attached to a structural member. Since the subwoofer case 64 is a structural member, the amplifier 100 may be directly attached to the back piece 68 forming a compact package as opposed to previous designs in which the amplifier is located remote to the subwoofer.

Amplifiers are typically formed of metal and are relatively stiff. The stiffness of the case 64 may be increased by attaching the amplifier 100 to the back piece 68. The amplifier 100 may be attached to the case 64 by one or more fasteners. In some embodiments, the amplifier 100 is directly attached to only the case 64, but in other embodiments, the amplifier may also be directly attached to the body structure 22. For example, the amplifier 100 may include a first mounting tab 102 attached to the third tab 74 as well as the wheel-house assembly 34 by a fastener 106. The amplifier 100 may also include a second mounting tab 104 located on an opposite side of the amplifier 100 from the first mounting tab 102. The second mounting tab 104 may be connected to the D-pillar 30 by a fastener 108. When arranged in this manner, the amplifier forms a structural bridge between the D-pillar 30 and the wheel-house assembly 34 to further increase the torsional stiffness of the body structure 22 in the subwoofer packaging space.

Figure 4:
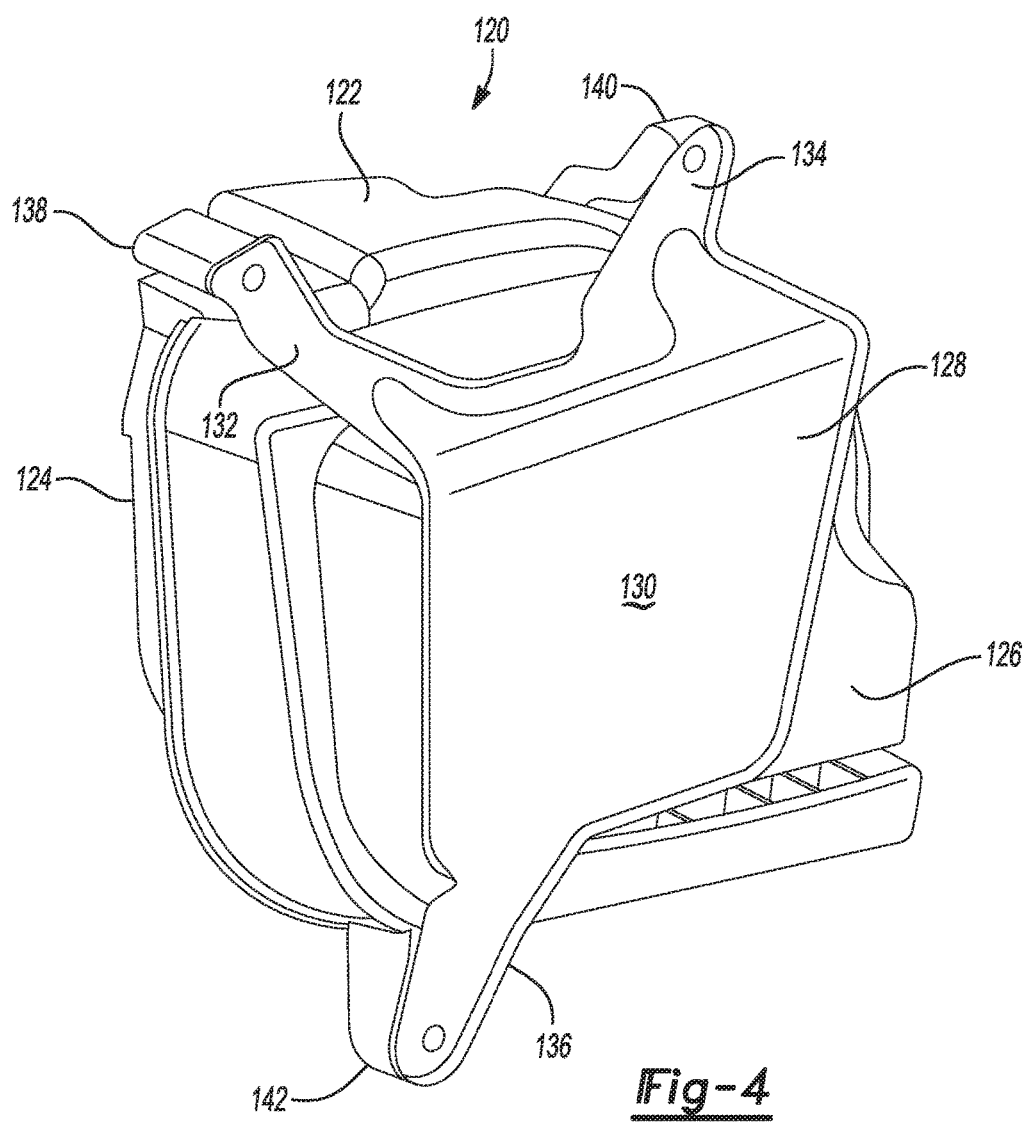
FIG. 4 is a perspective view of another structural subwoofer that includes a reinforcing plate.

Referring to FIG. 4, a subwoofer 120 includes a case 122 having a front side 124 and a backside 126. The case 122 also has a first tab 138, a second tab 140, and a third tab 142. These tabs are used to connect the case 122 with one or more components of the vehicle body structure such as the C-pillar, the D-pillar, the wheel-house assembly, the beltline reinforcement, and others. For example, the first tab 138 and the second tab 140 may be attached to the beltline reinforcement, and the third tab may be attached to the wheel-house assembly.

The subwoofer 120 is a structural component, but unlike the above described embodiments, the case 122 may not be formed of a material having a high modulus of elasticity. Instead, a reinforcing plate 128 is used to carry the loads through the subwoofer 120. The reinforcing plate 128 may include a central portion 130, a first arm 132, a second arm 134, and a third arm 136. The arms may be the portions of the reinforcing plate that are directly attached to the case 122. For example, the first arm 132 may be attached to the first tab 138, the second arm 134 may be attached to the second tab 140, and the third arm 136 may be attached to the third tab 142. The arms may be attached by fasteners or the like. For example, each arm may include an end portion that defines a hole for receiving a fastener. The reinforcing plate 128 may be formed of a material having a high modulus of elasticity such as steel, carbon fiber, titanium alloy, and others.

The reinforcing plate 128 forms a structural bridge between the components of the body structure to which it is attached. One or more load paths are defined in the reinforcing plate 128 between the body-structure components. The load paths of the reinforcing plate 128 may be similar to the load paths described above. For example, a first load path may extend from the third arm 136, through the central portion 130, and into the second arm 134 in order to transfer loads from the body-structure component attached to third arm 136 to the body-structure component attached to the second arm 134, or vice versa. The subwoofer 120 may define other load paths that extend between the other arms.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle body structure comprising:
   a wheel-house assembly;
   a D-pillar; and
   a subwoofer disposed between the D-pillar and the assembly, and including a carbon-fiber case having a first attachment attached to the assembly and a second attachment attached to the D-pillar to form a structural bridge spanning between the D-pillar and the assembly and defining a load path from the assembly, through the case, and into the D-pillar.

2. The vehicle body structure of claim 1 further comprising a C-pillar, wherein the wheel-house assembly is disposed between the C-pillar and the D-pillar and is joined to the C-pillar.

3. The vehicle body structure of claim 1 further comprising a beltline reinforcement extending from the D-pillar to the wheel-house assembly and having a midpoint defining a front half and a rear half, and wherein the case further has a third attachment attached to the front half and a fourth attachment attached to the rear half.

4. The vehicle body structure of claim 3, wherein the case forms a second structural bridge spanning between the first attachment and the fourth attachment and defining a second load path from the wheel-house assembly, through the case, and into the beltline reinforcement.

5. The vehicle body structure of claim 3, wherein the case forms a second structural bridge spanning between the second attachment and the third attachment and defining a second load path from the D-pillar, through the case, and into the beltline reinforcement.

6. The vehicle body structure of claim 1, wherein the subwoofer further includes a speaker disposed within the case.

7. The vehicle body structure of claim 1, wherein the case further includes a backside and an amplifier of the subwoofer is attached to the backside.

8. The vehicle body structure of claim 7, wherein the amplifier includes a mounting tab that is attached to the first attachment.

9. The vehicle body structure of claim 8, wherein the amplifier includes a second mounting tab that is attached to the D-pillar.

10. A vehicle comprising:
    a body structure including a first structural component and a second structural component spaced apart to define a space, and a third structural component extending from the first component to the second component and having a midpoint defining a front half and a rear half; and
    a structural subwoofer disposed in the space and including a case formed of carbon fiber, the case having a first attachment connected to the first component and a second attachment connected to the second component to form a structural bridge spanning between the components and defining a load path from the first component, through the case, and into the second component, the case further having a third attachment attached to the front half and a fourth attachment attached to the rear half.

11. The vehicle of claim 10, wherein the second structural component is a D-pillar.

12. The vehicle of claim 10, wherein the case forms a second structural bridge spanning between the first attachment and the fourth attachment and defining a second load path from the first component, through the case, and into the third structural component.

13. The vehicle of claim 10, wherein the subwoofer includes an amplifier attached to a backside of the case.

14. A vehicle comprising:
    a body structure including a first structural component and a second structural component spaced apart to define a space, and a third structural component extending from the first component to the second component and having a midpoint defining a front half and a rear half; and
    a structural subwoofer disposed in the space and including a case formed of a material having a modulus of elasticity is in excess of 100 gigapascals, the case having a first attachment connected to the first component and a second attachment connected to the second component to form a structural bridge spanning between the components and defining a load path from the first component, through the case, and into the second component, the case further having a third attachment attached to the front half and a fourth attachment attached to the rear half.

15. The vehicle of claim 14, wherein the case is formed of carbon fiber.

16. The vehicle of claim 14, wherein the second structural component is a D-pillar.

17. The vehicle of claim 14, wherein the case forms a second structural bridge spanning between the first attachment and the fourth attachment and defining a second load path from the first component, through the case, and into the third structural component.

18. The vehicle of claim 14, wherein the subwoofer includes an amplifier attached to a backside of the case.

\* \* \* \* \*